Patented July 22, 1924.

1,501,930

UNITED STATES PATENT OFFICE.

JUAN BAUTISTA VERGÉS, OF BUENOS AIRES, ARGENTINA.

DRIVING GEAR FOR TRACTORS AND THE LIKE.

Application filed December 15, 1923. Serial No. 681,018.

*To all whom it may concern:*

Be it known that I, JUAN BAUTISTA VERGÉS, a citizen of the Republic of Argentina, residing at Paseo Colon 515, Buenos Aires, Argentina, have invented certain new and useful Improvements in Driving Gears for Tractors and the like, of which the following is a specification.

My present invention relates to certain improvements in tractors its object being to provide a particular disposition of the spur gear of their driving wheels by which said gear is kept in a constant oil bath and at the same time a lubrication of the main axle is obtained.

Heretofore, one of the great drawbacks of the tractors in which the main gear is directly connected to the rim of the wheel is the fact that said gear cannot be properly lubricated and also the fact that said gear being unprotected any foreign matter such as sand, dust or the like has easy access to the teeth thereof which on meshing with the teeth of the driving pinion are very quickly worn out, thus necessitating a constant renewal of the driving gear of such tractors and at the same time a very great consumption of lubricants.

According to my present invention I have been able to enclose the main gear of the wheel and its driving pinion within a case which excludes all possibility of access of any foreign matter and at the same time is used as an oil chamber. The gear wheel itself I construct in such a form that I obtain the collection of the oil from the lower oil bath and when raised by the teeth of the gear to its top wherefrom it falls again, partly to the oil chamber through a collecting channel and partly on the main axle of the wheel.

Figure 1:
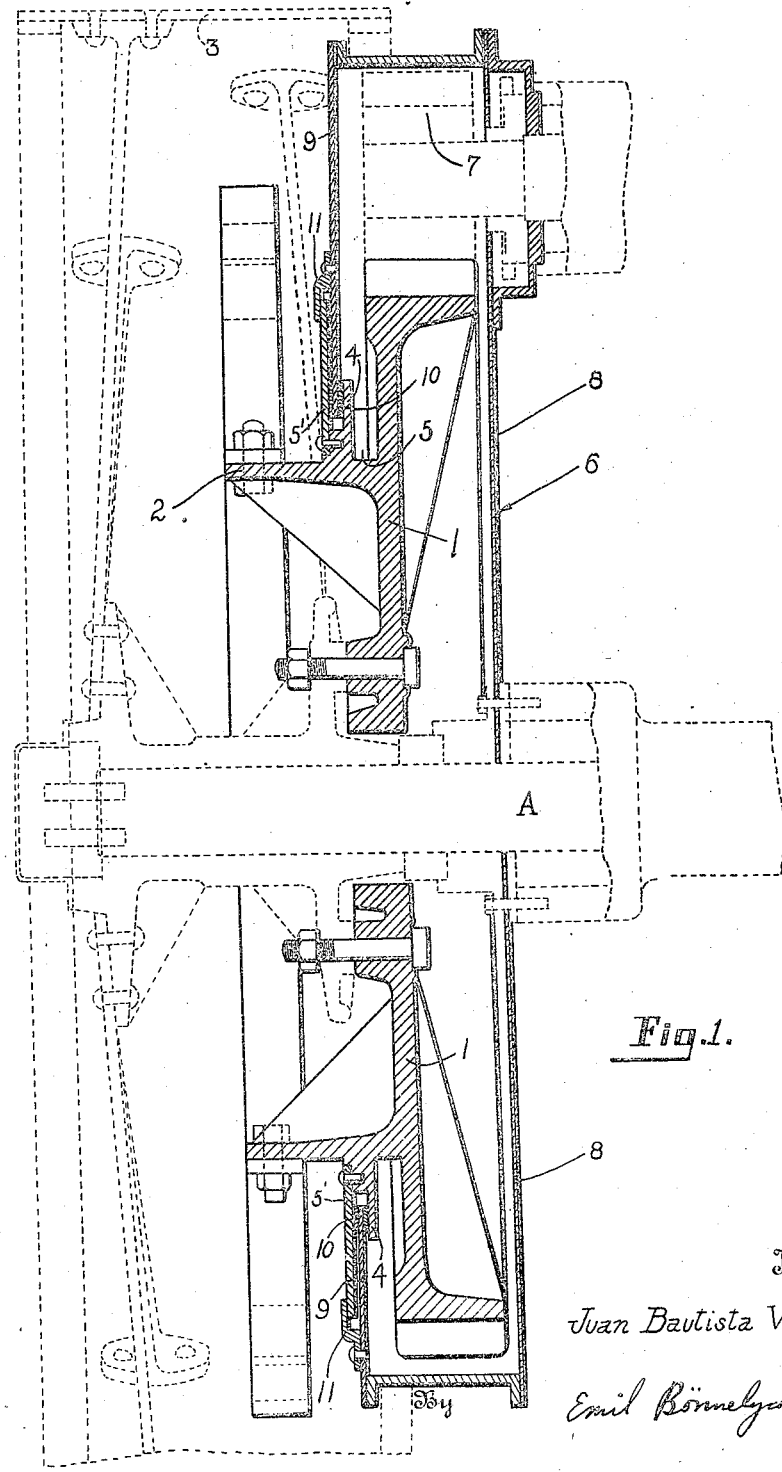
Figure 2:
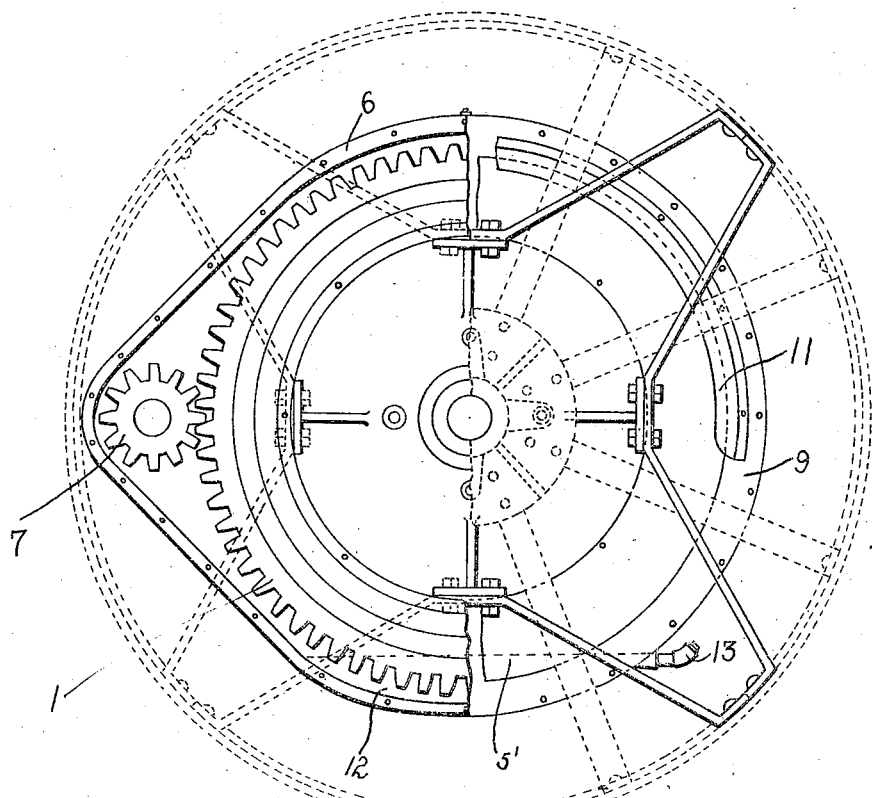

In order that my invention may be clearly understood and easily carried into practice a preferred embodiment thereof has been shown in the appended drawings wherein:

Fig. 1, is a horizontal sectional view of a tractor wheel according to my present invention and, Fig. 2, is a side view of the wheel with the case and other elements thereof partially cut off, so as to clearly show its construction.

Similar characters of reference denote same or like parts throughout the said figures.

The driving gear and casing according to my present invention may be used in connection with new tractors and may also be adapted to existing ones whereby no substantial change in the construction of the wheel is required.

According to my present invention on the flange 2 by which the rim 3 of the wheel is fixed to the gear 1 thereof through the usual means, I form a radially extending flanged disk 4 having a thickened inner portion where it is joined to the flange 2 and a thin outer portion formed by a shoulder and being located a suitable distance from the outer surface of the gear wheel thereby forming a channel 5 which I denominate an oil collecting channel.

On the outer side of the thickened portion of said flanged disk a cover disk 5' is suitably fixed by bolts or the like, the disk 5' rotating together with the said gear 1.

6 is a substantially oval case which encloses the gear 1 and the driving pinion 7. Said case is closed on the inner side by a lid 8 and on the outer side by a cover in the form of a disk 9 the inner edge of which is lodged in the free space between the disk 5' and the thin portion of the flanged disk 4, a tight joint being obtained by strips of leather or the like 10 located on either side of the disk 9.

A metallic joint protector or cover 11 is fixed to the upper half of the said cover 9, said protector overlapping the free edge of the disk.

With the construction as described I obtain an oil chamber 12 whereby the lower portion of the gear 1 is constantly kept in an oil bath, as may be seen from Fig. 2, the oil being carried up by the teeth of the gear and raised to the top thereof, from where it slides down partly to the collecting channel 5 and partly on the main axle A, which is thereby duly lubricated.

The conjunction of the disk 5', cover 9 and joint protector 11 prevents the access of all foreign matter to the oil box.

Said oil box is provided with a corresponding charge opening and an oil level as shown by 13.

The operation of my device will be clearly understood by all experts in the art.

It is obvious that many constructional and other changes may be introduced without departing from the scope of my present invention which has been clearly set forth in the appended claiming clauses.

Having now fully described and ascer- tained the nature of my present invention and in what manner the same is to be carried into practice, I declare that what I claim, and desire to protect by Letters Patent is:

1. In combination with a driving wheel for tractors, a driving gear comprising a flanged disk integral with said gear; a case surrounding said gear; a retaining disk secured to said case; a cover disk secured to said flanged disk of the gear; a joint protector secured to said retaining disk and overlapping the free edge of said cover disk; and means for obtaining a tight joint between said retaining disk and the flanged disk on one side and the cover disk on the other side, said flanged disk and the driving gear forming a channel for the passage of oil.

2. In combination with a driving wheel for tractors, a driving gear having a flange thereon comprising a radially extending flanged disk integral with said gear, said disk having a thickened inner portion where it joins the flange and a thin outer portion formed by a shoulder; a case surrounding said gear; and means for obtaining a tight joint between said flanged disk and said case.

3. In combination with a driving wheel for tractors, a driving gear comprising a flange thereon; a flanged disk integral with said flange and having a portion formed by a shoulder; a case surrounding said gear; and means for obtaining a tight joint between said flanged disk and said case, said flanged disk on one side, the driving gear on the other side and the flange on the bottom forming a channel for the passage of oil.

4. In combination with a driving wheel for tractors, a driving gear comprising a flange and a flanged disk integral therewith, said disk having a thickened inner portion where it joins the flange and a thin outer portion formed by a shoulder; a case surrounding said gear; a cover disk secured to said thickened portion of said flanged disk; and means between said cover disk and said case and said case and the thin outer portion of said flanged disk for obtaining tight joints.

5. In a combination with a driving wheel for tractors, a driving gear comprising a flange and a flanged disk integral therewith, said disk having a thickened inner portion where it joins the flange and a thin outer portion formed by a shoulder; a case surrounding said gear; a cover disk secured to said thickened portion of said flanged disk; and means between said cover disk and said case and said case and the thin outer portion of said flanged disk for obtaining tight joints, said flanged disk and said gear forming a channel for the passage of oil.

In testimony whereof I affix my signature.

JUAN BAUTISTA VERGÉS.